US012676568B2

(12) United States Patent
Choe et al.

(10) Patent No.: US 12,676,568 B2
(45) Date of Patent: Jul. 7, 2026

(54) ELECTRONIC DEVICE FOR PERFORMING BOTTOM-UP POWER LINE COMMUNICATION AND METHOD FOR OPERATING SAME

(71) Applicants: LG ELECTRONICS INC., Seoul (KR); THE INDUSTRY & ACADEMIC COOPERATION IN CHUNGNAM NATIONAL UNIVERSITY, Daejeon (KR)

(72) Inventors: Se Hwa Choe, Seoul (KR); Cha Seung Jun, Seoul (KR); Sung Yong Shin, Seoul (KR); Sun Ku Kwon, Seoul (KR); Dong Hyun Lim, Seoul (KR)

(73) Assignees: LG Electronics Inc., Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 279 days.

(21) Appl. No.: 18/274,355

(22) PCT Filed: Mar. 9, 2021

(86) PCT No.: PCT/KR2021/002929
§ 371 (c)(1),
(2) Date: Jul. 26, 2023

(87) PCT Pub. No.: WO2022/163900
PCT Pub. Date: Aug. 4, 2022

(65) Prior Publication Data
US 2024/0072712 A1 Feb. 29, 2024

(30) Foreign Application Priority Data
Jan. 26, 2021 (KR) ........................ 10-2021-0010785

(51) Int. Cl.
H02P 27/08 (2006.01)
A47L 9/28 (2006.01)
H02P 5/50 (2016.01)

(52) U.S. Cl.
CPC .......... *H02P 27/085* (2013.01); *A47L 9/2842* (2013.01); *H02P 5/50* (2013.01); *H02P 2209/11* (2013.01)

(58) Field of Classification Search
CPC ...... H02P 27/085; H02P 5/50; H02P 2209/11; A47L 9/2842; A47L 9/2894; A47L 9/2805; A47L 9/2847; H04B 3/548; H04B 3/54
(Continued)

(56) References Cited

U.S. PATENT DOCUMENTS

| 6,239,576 | B1 * | 5/2001 | Breslin | ................. | A47L 9/2889 |
| | | | | | 15/377 |
| 9,301,665 | B2 * | 4/2016 | Clothier | ................ | A47L 9/2894 |
| 9,973,131 | B2 * | 5/2018 | Lee | ........................... | H02P 6/28 |

FOREIGN PATENT DOCUMENTS

| JP | 2005-110815 A | 4/2005 |
| JP | 2006-51187 A | 2/2006 |
(Continued)

OTHER PUBLICATIONS

Degardin et al., "Feasibility of a high-bit-rate power-line communication between an inverter and a motor," IEEE Transactions on Industrial Electronics, Dec. 5, 2013, 61(9):4816-23.
(Continued)

*Primary Examiner* — David Luo
(74) *Attorney, Agent, or Firm* — Fish & Richardson P.C.

(57) ABSTRACT

Provided an electronic device including a main body and a kit connected to the main body, and the main body includes a battery, a first motor, an electric wire connected to the
(Continued)

battery, and a first controller connected to the electric wire, the kit includes a second motor supplied with power through the electric wire, an inverter connected to the second motor, and a second controller connected to the electric wire and configured to control driving of the inverter, and the second controller is configured to transmit information to the first controller through switching frequency control of the inverter and control a switching frequency of the inverter so that a current associated with the second motor is greater than zero in a section in which transmission of the information is performed.

15 Claims, 9 Drawing Sheets

(58) Field of Classification Search
USPC ................ 318/801, 800, 799, 798, 767, 727
See application file for complete search history.

(56)                     References Cited

FOREIGN PATENT DOCUMENTS

| | | | |
|---|---|---|---|
| KR | 10-0161987 | B1 | 12/1998 |
| KR | 10-0798325 | B1 | 1/2008 |
| KR | 10-1890212 | B1 | 8/2018 |
| KR | 10-2019-0131932 | | 11/2019 |
| KR | 10-2021-0138342 | | 11/2021 |

OTHER PUBLICATIONS

Hagmann, "A spread spectrum communication system for load management and distribution automation. IEEE Transactions on Power Delivery," Jan. 1989, 4(1):75-81.

* cited by examiner

911

912

ELECTRONIC DEVICE FOR PERFORMING BOTTOM-UP POWER LINE COMMUNICATION AND METHOD FOR OPERATING SAME

CROSS-REFERENCE TO RELATED APPLICATIONS

This application is a National Stage application under 35 U.S.C. § 371 of International Application No. PCT/KR2021/002929, filed on Mar. 9, 2021, which claims benefit of Korean Patent No. 10-2021-0010785, filed on Jan. 26, 2021. The disclosures of the prior applications are incorporated by reference in their entirety.

TECHNICAL FIELD

This disclosure relates to an electronic device for performing bottom-up power line communication for transmitting information to a main body from a kit connected to the main body and a method for operating a same. Specifically, an electronic device and a method for operating a same in the present specification may transmit information from a kit to a main body based on communication using an electric wire.

BACKGROUND ART

With the development of electronic technologies, various electronic devices are used in every aspect of life. For example, a cleaner is an electronic device to perform cleaning by operating a motor based on power being supplied to suck or wipe dust or a foreign substance in an area to clean.

The cleaner as such, for example, may be divided into a manual cleaner directly moved by a user for performing cleaning and an automatic cleaner performing cleaning while autonomously traveling. The manual cleaner may be divided into, for example, a canister-type cleaner, an upright-type cleaner, a hand-type cleaner, a stick-type cleaner, or the like depending on a shape of the cleaner.

The manual cleaner as such, for example, may include at least one of a kit (or a cleaning kit) which is a part performing a cleaning operation (e.g., suction of the foreign substance or wiping with a damp cloth) being adjacent to a cleaning target, a pipe (or a stick) connected to a nozzle, having an adjustable length, and providing a moving passage for the foreign substances, a motor providing foreign substance suction force, and a controller controlling an output of the motor.

Meanwhile, due to a recent development of the electronic technologies, in order to increase an effect of a cleaning operation of the cleaner, a research for adaptively changing an operation of the cleaner based on a state of the cleaner is being actively conducted. For example, when the cleaner is fast moved in a state in which a motor output is constant, a foreign substance suction amount may be decreased compared to when the cleaner is slowly moved. In addition, when the cleaning operation is disturbed by a foreign substance adhering to a nozzle, the foreign substance suction amount may be decreased. Accordingly, it is required to increase the effect of the cleaning operation by controlling the foreign substance taking amount depending on the state of the cleaner.

In association with the cleaner as such, the prior documentation as follows may be referenced.

Prior documentation 1: KR100798325 B1

The prior documentation 1 has a feature in which a control signal is transmitted by using power line communication based on an input on a switch corresponding to each operation in association with a cleaner having a vacuum cleaning function and a steam generation function. However, the prior documentation 1 describes the communication being performed by using a power line, not the cleaner being controlled so that constant communication performance is secured in various use environments of the cleaner.

DISCLOSURE OF INVENTION

Technical Goals

An aspect of the present specification is to provide an electronic device and an operation method thereof for transmitting information from a kit to a main body using an electric wire included in the electronic device so that constant communication performance is guaranteed regardless of a use environment of the electronic device.

Another aspect of the present specification is to provide an electronic device and an operation method thereof for securing stable communication performance and saving use power allowing an operation of a kit to vary depending on whether communication between a main body and the kit in the electronic device is performed or not.

However, the goals to be achieved by the present disclosure are not limited to the objectives described above. Although not described, the goals may include other objectives that those skilled in the art of the present disclosure may clearly understand from the following description.

Technical Solutions

According to an aspect, there is provided an electronic device including a main body and a kit connected to the main body, and the main body includes a battery, a first motor, an electric wire connected to the battery, and a first controller connected to the electric wire, the kit includes a second motor supplied with power through the electric wire, an inverter connected to the second motor, and a second controller connected to the electric wire and configured to control driving of the inverter, and the second controller is configured to transmit information to the first controller through switching frequency control of the inverter and control a switching frequency of the inverter so that a current associated with the second motor is greater than zero in a section in which transmission of the information is performed.

According to another aspect, there is also provided an operation method of an electronic device comprising a main body and a kit connected to the main body, the operation method including controlling a switching frequency of an inverter included in the kit, and transmitting information from the kit to the main body based on control of the switching frequency, and the main body comprises a battery, a first motor, an electric wire connected to the battery, and a first controller connected to the electric wire, the kit includes a second motor supplied with power through the electric wire, the inverter connected to the second motor, and a second controller connected to the electric wire and configured to control driving of the inverter, and a current associated with the second motor is greater than zero in a section in which transmission of the information is performed through the control of the switching frequency.

Effects

According to example embodiments of the present specification, when information is transmitted from a kit to a main body by using an electric wire included in an electronic device, the electronic device and an operation method thereof may control an inverter so that a voltage of a motor is maintained to be greater than zero. Through this, it is possible to guarantee constant performance so that performance of communication using the electric wire is not decreased regardless of a use environment of the electronic device.

Also, according to example embodiments of the present specification, the electronic device and the operation method thereof may control a driving signal of the motor so that an intensity of a current is constantly maintained although a voltage of a direct current (DC) terminal or an operation point of the motor is changed. Through this, reliability and the performance of the communication using the electric wire may be increased.

Furthermore, according to example embodiments of the present specification, when a difference between a driving voltage of the motor and a voltage of a battery is small, the electronic device and the operation method thereof may temporarily decrease the driving voltage of the motor to secure a voltage for the communication using the electric wire. Through this, the performance of the communication using the electric wire may be guaranteed regardless of the use environment of the electronic device.

In addition, according to example embodiments of the present specification, the electronic device and the operation method thereof may change an operation method of the kit depending on whether power line communication is performed. Through this, power consumption may be decreased.

However, effects to be acquired in the present specification are not limited to the effects described above. Other effects not described may be clearly understood from the following description by those skilled in the art of the present disclosure.

BEST MODE FOR CARRYING OUT THE INVENTION

Figure 1:
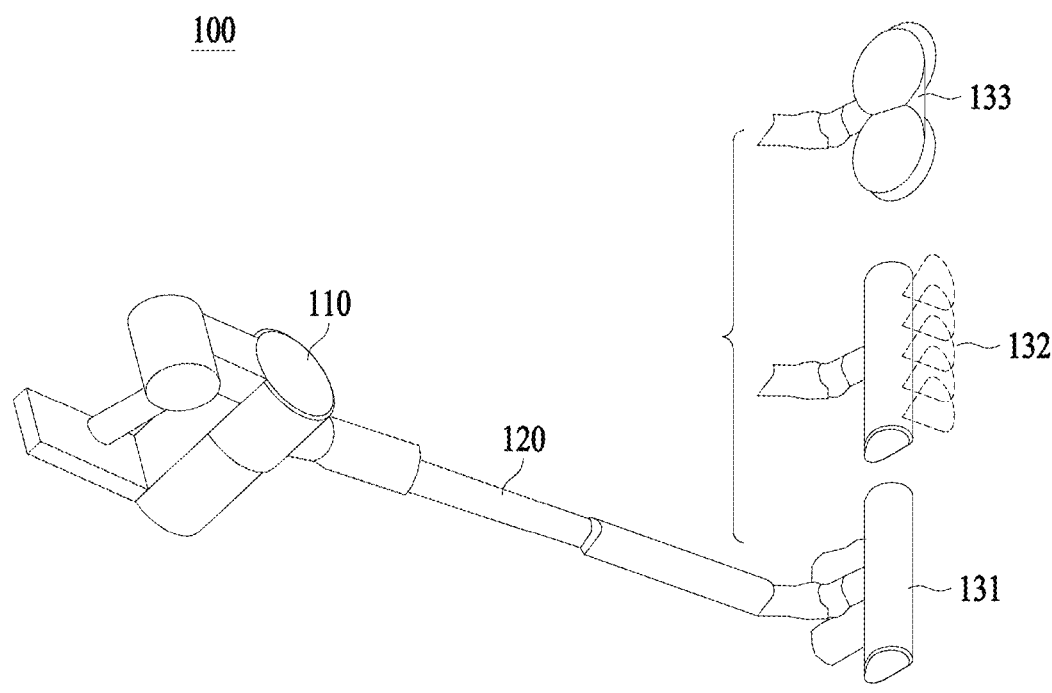
FIG. 1 is a diagram illustrating an example of an electronic device including a main body and a kit.

Hereinafter, example embodiments will be described in detail with reference to the drawings so that those skilled in the art may easily carry out the example embodiments. The following example embodiments may be implemented in many different forms and are not limited to the example embodiments described herein.

Contents irrelevant to descriptions are omitted for the clear descriptions, and the same or similar components are given the same reference numerals throughout the entire specification. Also, some example embodiments will be described in detail with reference to the exemplary drawings. In adding reference numerals to components in each drawing, the same components may have the same numerals wherever possible although shown on other drawings. In addition, in describing the present disclosure, when the subject matter of example embodiments is determined to be obscured by specific descriptions of relevant components or functions known in advance, detailed descriptions thereof may be omitted.

Terms such as "first", "second", "A", "B", "(a)", or "(b)" may be used to describe components of example embodiments. The terms as such are merely used to distinguish a component from another component. Essence, an order, a sequence, the number, or the like of the component is not limited by the terms. When any components are described as being "connected", "combined", or "linked" with each other, it may be understood that any components may be directly connected or linked with each other, that another component may be interposed between each of the components, or that each component is "connected", "combined", or "linked" through another component.

In the present disclosure, terms such as "include", "comprise", or "have" are used to designate a feature, a number, a step, an operation, a component, a part, or a combination thereof being present, which are described in the specification. It may be understood that a possibility of one or more other features, numbers, steps, operations, components, parts, or combinations thereof being present or added is not excluded in advance.

In addition, in implementing the present disclosure, for convenience of description, components may be described as being subdivided. However, the component may be implemented in one device or module, or one component may be separately implemented in multiple devices or modules.

Hereinafter, an electronic device according to an example embodiment will be described.

FIG. 1 is a diagram illustrating an example of an electronic device including a main body and a kit. FIG. 1 illustrates an example of an electronic device including a main body 110 and kits 131, 132, and 133 connectable to the main body.

Referring to FIG. 1, an electronic device 100 may include the main body 110, a pipe (or a stick) 120, and the kits 131, 132, and 133. The main body 110 of the electronic device 100 may be connected to the kit 131, 132, or 133 with the pipe 120 interposed between the main body 110 and the kit 131, 132, or 133. One or more of the kits 131, 132, and 133 connectable to the main body may be present as illustrated. A form or shape of each of the kits 131, 132, and 133 may be differently implemented. Accordingly, respective functions corresponding to the kits 131, 132, and 133 may be different from each other. For example, a first kit (e.g., the kit 131) may be a kit including a nozzle implemented to be convenient for cleaning a carpet, a second kit (e.g., the kit 132) may be a kit implemented to be convenient for cleaning a dark space, and a third kit (e.g., the kit 133) may be a kit implemented to be convenient for wiping with a damp cloth.

Each of the kits 131, 132, and 133 may be selectively combined with the main body 110 depending on a need of a user. Accordingly, the electronic device 100 may easily implement various cleaning operations. Meanwhile, a kit may include various forms in addition to those described through the present specification, which is easily understood by those skilled in the art. Thus, a specific description thereof will be omitted.

The electronic device 100 may be implemented as a cleaner (e.g., a vacuum cleaner) as illustrated. However, the present disclosure is not limited thereto and may be applied to various electronic devices in which communication between the main body 110 and the kit 131, 132, or 133 is required.

According to example embodiments, the kit 131, 132, or 133 may be referred to as a nozzle. However, the present specification is not limited to such a term.

Figure 2:
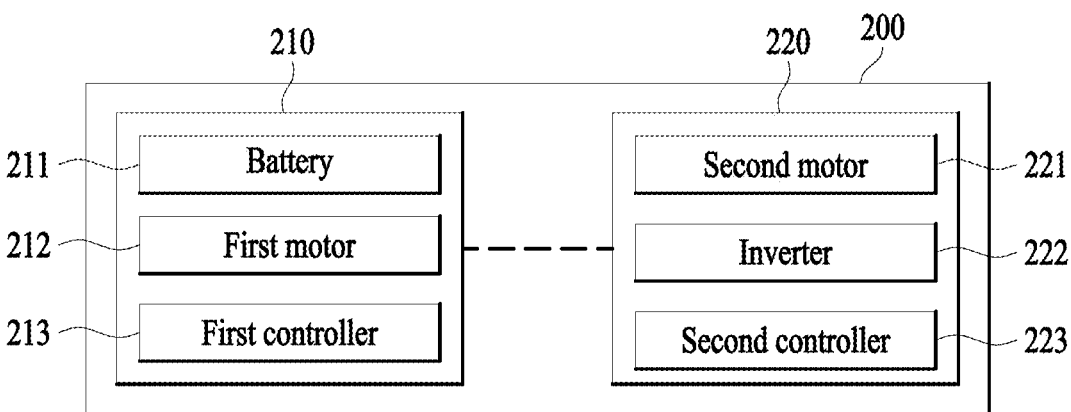
FIG. 2 is a functional block diagram illustrating an electronic device according to an example embodiment of the present specification.

FIG. 2 is a functional block diagram illustrating an electronic device according to an example embodiment of the present specification. An element of an electronic device 200 described later may be a unit processing at least one function or operation and may be implemented by hardware, software, or a combination of the hardware and the software.

Referring to FIG. 2, the electronic device 200 may include a main body 210 and a kit 220. The main body 210 may include a battery 211, a first motor 212, and a first controller 213. A kit 220 may include a second motor 221, an inverter 222, and a second controller 223.

Although not illustrated, the electronic device 200 may further include a pipe connecting the main body 210 and the kit 220. An electric wire connecting the main body 210 and the kit 220 may be arranged in the pipe. In example embodiments, a foreign substance may be sucked through the kit 220. In such a case, the sucked foreign substance may move to the main body 210 through the pipe and may be stored in a foreign substance storage part.

The main body 210 may include the battery 211 supplying power for an operation of the electronic device 200, the first motor 212 controlling an output for a cleaning operation of the electronic device 200, and the first controller 213 controlling overall operations of the electronic device 200.

The battery 211 may supply the power (or electric power) for driving of the electronic device 200. Specifically, the battery 211 may be connected to each component of the electronic device 200 through the electric wire and supply the power to each component of the electronic device 200. The electronic device 200 may perform various operations based on supply of the power.

The battery 211 may be implemented as an internal type or an external type and in a wired or wireless form. However, the battery 211 is not limited thereto and may be implemented in various forms.

The first motor 212 may provide a driving force for the cleaning operation of the electronic device 200. For example, the first motor 212 may provide a suction force to the kit 220. For example, when the first motor 212 operates, a foreign substance suction force may be generated, and the foreign substances may be sucked into the kit 220. Various known motors used in a cleaner (or a vacuum cleaner) may be used for the first motor 212.

The first controller 213 may control the overall operations of the electronic device 200. The first controller 213 may be implemented to include at least one processor and may control the operation of the electronic device 200 by executing stored instructions.

The first controller 213 may be connected to the battery 211 through the electric wire. The first controller 213 may be connected between the battery 211 and the second controller 223 of the kit 220. The first controller 213 may receive information from the kit 220 and identify a use environment associated with the electronic device 200 based on the received information. The controller 213 may control the operation of the electronic device 200 based on the identified use environment.

For example, when the identified use environment indicates a use environment in which dust is greater than or equal to a predesignated density, the first controller 213 may drive the motor at a first intensity to generate the suction force to be a predetermined value or more. Accordingly, the kit 220 may more effectively perform the cleaning operation.

In example embodiments, the main body 210 may include a low pass filter circuit of which one side is connected to the electric wire and another side is connected to the first controller 213. In such a case, the first controller 213 may control an operation of the kit 220 based on an output value of the low pass filter circuit. For example, the information transmitted from the kit 220 may be output via the low pass filter circuit and arrive at the first controller 213. The first controller 213 may identify the information transmitted from the kit 220 based on the output value of the low pass filter circuit. The first controller 213 may control the operation of the kit 220 based on the identified information. For example, when the identified information includes information indicating that a load of a predetermined value or more is applied to the kit 220, the first motor 212 may be controlled so that the suction force of the electronic device 200 is increased.

The kit 220 may include the second motor 221, the inverter 222, and the second controller 223. Although not illustrated, according to example embodiments, the kit 220 may include various components configured to clean a surface to clean by removing a foreign substance, such as a rotating shaft lengthily formed left and right, a brush unit including a brush arranged on an outer periphery of the rotating shaft in a protruding manner, a rotating cleaning unit provided to rotate parallel to the surface to clean, and a suction flow path for suction of air and a foreign substance with the foreign substance suction force supplied by the first motor 212.

The second motor 221 may include at least one motor for driving the kit 220. For example, the second motor 221 may include a motor for driving the rotating cleaning unit, a pump or a spray nozzle for discharging water, or the like. However, the second motor 221 is not limited thereto, and various components may be included or some components may be omitted depending on example embodiments.

In example embodiments, the second motor 221 may include a DC motor. In such a case, a DC voltage is required for driving of the second motor 221. However, since an operation speed of the second motor 221 may be changed depending on the use environment of the electronic device 200, a pulse width modulation (PWM) duty for the driving of the second motor 221 may also be changed in response to the operation speed being changed.

For example, although a reference voltage of 25 volts (V) is applied to the second motor 221, a load associated with the electronic device 200 may be different depending on an environment (e.g., a floor surface or a surface covered with a carpet) adjacent to the electronic device 200. In such a case, when the load is increased, the operation speed of the motor is decreased. Thus, in order to control the operation of the electronic device 200 with constant performance regardless of the load associated with the electronic device 200, there is a need to drive the second motor 221 at a higher speed when the load is high (e.g., the surface covered with the carpet) than that when the load is low.

Accordingly, through control of the inverter 222 which will be described later, a current (or an intensity of the current or an instantaneous value of the current) of the second motor 221 may be controlled to be always greater than zero. As such, a mode in which the current of the second motor 221 is always greater than zero may be a continuous conduction mode (CCM). An example of a current waveform when the second motor 221 operates in the CCM will be specifically described with reference to FIG. 4. Meanwhile, the current of the second motor 221 at this point may be the instantaneous value.

The inverter 222 may be connected to the second motor 221 and change a rotation speed of the second motor 221. For example, the inverter 222 may change the rotation speed of the second motor 221 based on a frequency (e.g. a switching frequency) associated with the second motor 221 being changed based on control of the second controller 223.

The second controller 223 may be connected to the electric wire connected to the battery 211. The second controller 223 may transmit the information to the first controller 213 using the electric wire based on a connection with the electric wire. The second controller 223 may control driving of the inverter 222. The second controller 223 may transmit the information to the first controller 213 through switching frequency control of the inverter 222. Specifically, the second controller 223 may control the switching frequency of the inverter 222 so that the current associated with the second motor 221 is greater than zero in a section in which transmission of the information is performed. In such a case, the second controller 223 may set the switching frequency high to be greater than or equal to a predetermined value (e.g., 40 kilohertz (kHz)) so that, with respect to all driving voltages associated with the second motor 221, the current of the second motor 221 is maintained to be greater than zero even under a load-free condition. A value of the frequency allowing the current to be greater than zero may be predesignated.

In example embodiments, the second controller 223 may control the switching frequency of the inverter 222 so that the current (or the intensity of the current or the instantaneous value of the current) associated with the second motor 221 is zero in at least a partial section in a period in which the transmission of the information is not performed. In other words, the second motor 221 may operate in the CCM in response to communication using the electric wire being performed. In such a case, when the communication using the electric wire is not performed according to example embodiments, the second motor 221 may operate in a discontinuous conduction mode (DCM).

In example embodiments, the second controller 223 may identify, based on detection or generation of the information to transmit to the first controller 213, whether the communication using the electric wire is performed. When the second controller 223 identifies that the communication is to be performed, the second controller 223 may control the switching frequency of the inverter 222 so that the current associated with the second motor 221 is greater than zero.

In example embodiments, when the second motor 221 operates in the CCM, an intensity of a current for the electric wire may be increased even by only a change of the switching frequency while the PWM duty is identical.

In example embodiments, the second controller 223 may control the switching frequency so that the current flowing through the electric wire includes a sinusoidal component. In such a case, the information may be transmitted from the second controller 223 to the first controller 213 based on a property of the sinusoidal component. The property of the sinusoidal component may include, for example, a form of a sinusoidal wave, an intensity (e.g., an instantaneous value or an effective value) of the sinusoidal wave, and a frequency band indicated by a frequency of the sinusoidal wave.

In example embodiments, the second controller 223 may transmit the information to the first controller 213 based on a current shaping method. Specifically, the second controller 223 may transmit the information to the first controller 213 through the current flowing through the electric wire being shaped through control of the switching frequency. In such a case, a current of which at least one of an intensity and a frequency of the current is modified based on the current shaping method may be generated. The information may be transmitted to the first controller 213 to correspond to the generated current being transmitted to the first controller 213.

At this point, the current shaping method may be defined as a method of performing communication based on a predetermined frequency for a signal that a recipient recognizes by modifying an intensity and/or a frequency of a current and information configured in advance and corresponding thereto.

For example, the second controller 223 may modify a frequency of a current based on a predetermined frequency for transmitting an operation state of the kit 220. For example, a signal for indicating that the operation state of the kit 220 is a state of "on" may be a current modified to have a frequency of 100 kHz, and a signal for indicating that the operation state of the kit 220 is a state of "off" may be a current modified to have a frequency of 200 kHz. However, it is merely an example, and the present example embodiment is not limited to the example as such.

In example embodiments, the second controller 223 may control the second motor 221 based on a PWM duty value of a switching signal of the inverter 222 determined based on at least one value of a voltage, a resistance, and an inductance of the second motor 221. In such a case, although a DC terminal voltage of the second motor 221 or an operation point of the second motor 221 is changed, the second controller 223 may control the intensity of the current of the electric wire controlling the second motor 221 based on the PWM duty value.

To more specifically describe, the second controller 223 may synthesize an additional current (hereinafter, referred to as a communication current) for the communication using the electric wire, for example, a sine wave. In terms of a form of the communication current, at least one of a frequency or an intensity may be variously changed depending on a data quantity for the communication. However, so that the communication current is synthesized at a level or more of certain performance to secure communication performance, the second controller 223 may control the second motor 221 based on a change of the PWM duty. At this point, the second controller 223 may determine the PWM duty value that is changed based on at least one value of a voltage, a resistance, and an inductance of the second motor 221.

Figure 5:
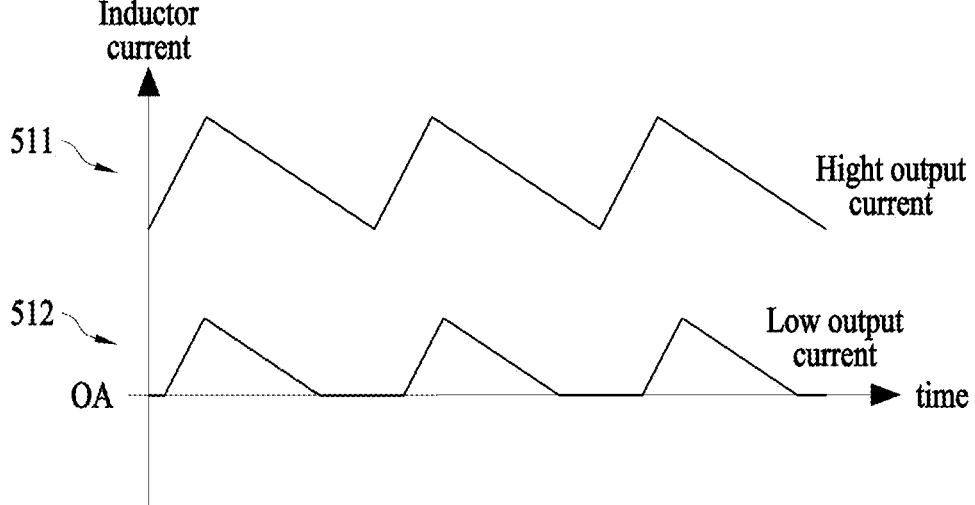
FIG. 5 is a diagram illustrating a motor voltage of an electronic device according to an example embodiment of the present specification.

In example embodiments, the PWM duty value may be determined based on an equation derived based on an equivalent circuit associated with the second motor 221. FIG. 5 may be referenced for a specific description associated with the equivalent circuit and the equation associated with the second motor 221.

Meanwhile, the current for the communication using the electric wire has included the sine wave as an example, but the current for the communication using the electric wire is not limited thereto, and currents in various forms such as a triangle wave, a square wave, and a pulse may be used.

In example embodiments, communication from the second controller 223 to the first controller 213 may be based on timesharing communication. The timesharing communication may include a communication method in which a procedure of information being transmitted from the main body 210 to the kit 220 and a procedure of information being transmitted from the kit 220 to the main body 210 are sequentially performed in a predesignated order. Since the timesharing communication is easily understood by those skilled in the art, a specific description thereof will be omitted.

In an example embodiment, the second controller 223 may control the second motor 221 so that a difference between an output voltage of the battery 211 and a voltage corresponding to the second motor 221 is maintained to be a predetermined value or more. As an example, when the difference between the output voltage of the battery 211 and the voltage corresponding to the second motor 221 is less than the predetermined value, the second controller 223 may control a driving voltage of the second motor 221. As another example, the second controller 223 may control the voltage corresponding to the second motor 221 to be decreased in response to the difference between the output voltage of the battery 211 and the voltage corresponding to the second motor 221 being less than a predesignated value.

To specifically describe, in example embodiments, the second controller 223 may transmit the information to the first controller 213 based on the timesharing communication. In such a case, when the information is not being transmitted from the second controller 223 to the first controller 213, the second controller 223 may maximally use the voltage provided from the battery 211 for the driving of the second motor 221. However, since a certain voltage, for example, 2 V may be required for the communication using the electric wire, a partial voltage used for the driving of the second motor 221 may be used for the communication using the electric wire when the transmission of the information from the second controller 223 to the first controller 213 starts.

For example, a maximum voltage required for the driving of the second motor 221 may be 2 V, and the voltage of the battery 211 may be 24 V. In such a case, when the communication using the electric wire from the second controller 223 to the first controller 221 is not being performed, the voltage of 24 V of the battery 211 may be used for the driving of the second motor 221. When the communication using the electric wire from the second controller 223 to the first controller 221 is being performed, a voltage of 2 V may be used for the communication using the electric wire, and a voltage of 22 V of the battery 211 may be used for the driving of the second motor 221.

In such a case, when the voltage of the battery 211 is sufficient, a voltage sufficient for the driving of the second motor 221 may be supplied although the communication using the electric wire is performed. Thus, performance of the communication using the electric wire may be guaranteed. However, there may be an issue when the voltage of the battery is insufficient (for example, when a remaining capacity of the battery 211 is equal to or less than a predesignated value). In such a case, the second controller 223 may control the second motor 221 so that the electric wire current is constantly maintained.

As an example, the second controller 223 may control the second motor 221 so that the difference between the output voltage of the battery 211 and the voltage corresponding to the second motor 221 is maintained to be the predetermined value or more comparing the output voltage of the battery 211 and the voltage corresponding to the second motor 221. At this point, the voltage corresponding to the second motor 221 may be the driving voltage of the second motor 221. As another example, the second controller 223 may control the voltage corresponding to the second motor 221 to be decreased in response to the difference between the output voltage of the battery 211 and the voltage corresponding to the second motor 221 being less than the predesignated value. In such a case, a voltage for the electric wire current may be secured and thus, the performance of the communication using the electric wire may be guaranteed. FIG. 5 may be referenced for a specific example associated therewith.

As such, when the voltage of the battery 211 becomes insufficient, the electronic device 200 according to example embodiments of the present specification may secure the performance of the communication using the electric wire by controlling the driving voltage of the second motor 221.

The information transmitted from the second controller 223 to the first controller 213 based on the above-described communication using the electric wire may include, as an example, at least one of identification information on the kit 220, operation information on the second motor 221, use time information on the kit 220, sensing information on an object adjacent to the kit 220, and revolutions per minute (RPM) information on the second motor 221.

As another example, the information transmitted from the second controller 223 to the first controller 213 the identification information on the kit 220 and actual operation information on the kit 220 corresponding to control information received by the kit 220. The identification information on the kit 220, for example, may include information indicating a type of the kit 220. The actual operation information on the kit 220, for example, may include information on whether the kit 220 is operating to match a set value (or an input value).

In example embodiments, the kit 220 may be detachable from the main body 210 and further include a sensor sensing whether the kit 220 is detached from the main body 210. In such a case, the second controller 223 may sense coupling with the main body 210 through the sensor. The second controller 223 may transmit data to the first controller 213 based on the coupling with the main body 210 being sensed and the current shaping method.

Figure 3:
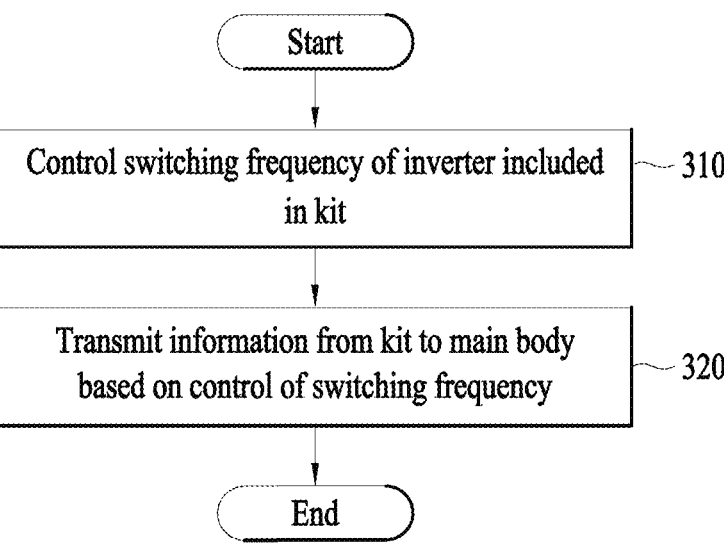
FIG. 3 is a flowchart illustrating each operation in an operation method of an electronic device according to an example embodiment of the present specification.

FIG. 3 is a flowchart illustrating each operation in an operation method of an electronic device according to an example embodiment of the present specification. It is a matter of course that each operation of a method illustrated by FIG. 3 may be performed in an order different from that illustrated by the drawing depending on cases. In the following descriptions with reference to the drawing, redundant descriptions similar to the above descriptions may be omitted.

Referring to FIG. 3, in operation 310, an electronic device may control a switching frequency of an inverter included in a kit. A current associated with a second motor of the kit in a section in which transmission of information is performed by control of the switching frequency may be greater than zero. For example, the electronic device may allow the transmission of the information to be performed in a state in which the switching frequency of the inverter is greater than or equal to 40 kHz.

In operation 320, the electronic device may transmit the information from the kit to a main body based on the control of the switching frequency of the inverter. The information transmitted from the kit to the main body may be generated by a second controller of the kit. The information may include at least one of identification information on the kit, operation information on the second motor, use time information on the kit, sensing information on an object adjacent to the kit, and RPM information on the second motor.

The transmission of the information from the kit to the main body may be performed by using an electric wire, and a current flowing through the electric wire for the transmission of the information may include a sinusoidal component. The transmission of the information may be performed based on a property of the sinusoidal component.

Figure 6:
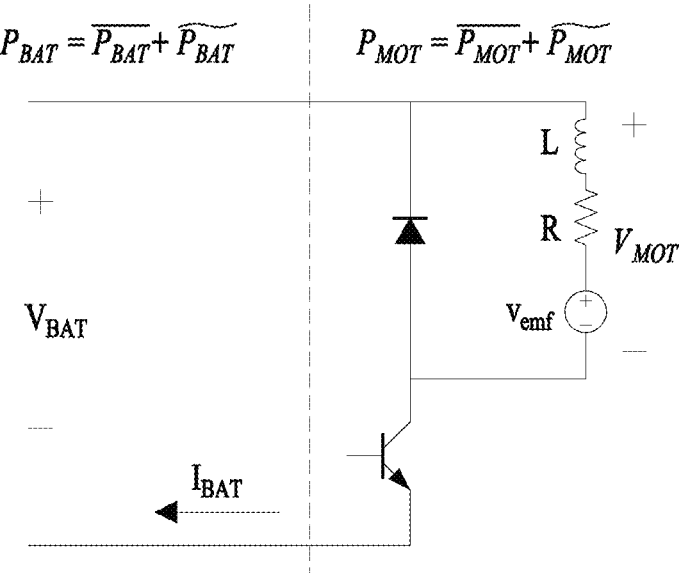
FIG. 6 illustrates an example of an equivalent circuit diagram for an intensity analysis of an electric wire current of an electric device according to an example embodiment of the present specification.

The electronic device may control the second motor based on a PWM duty value of an inverter switching signal determined based on at least one value of a voltage, a resistance, and an inductance of the second motor. In such a case, although a DC terminal voltage or an operation point of the second motor is changed, an intensity of the electric wire current for communication using the electric wire may be constantly maintained. FIG. 6 may be referenced for a specific example associated therewith.

Figure 7:
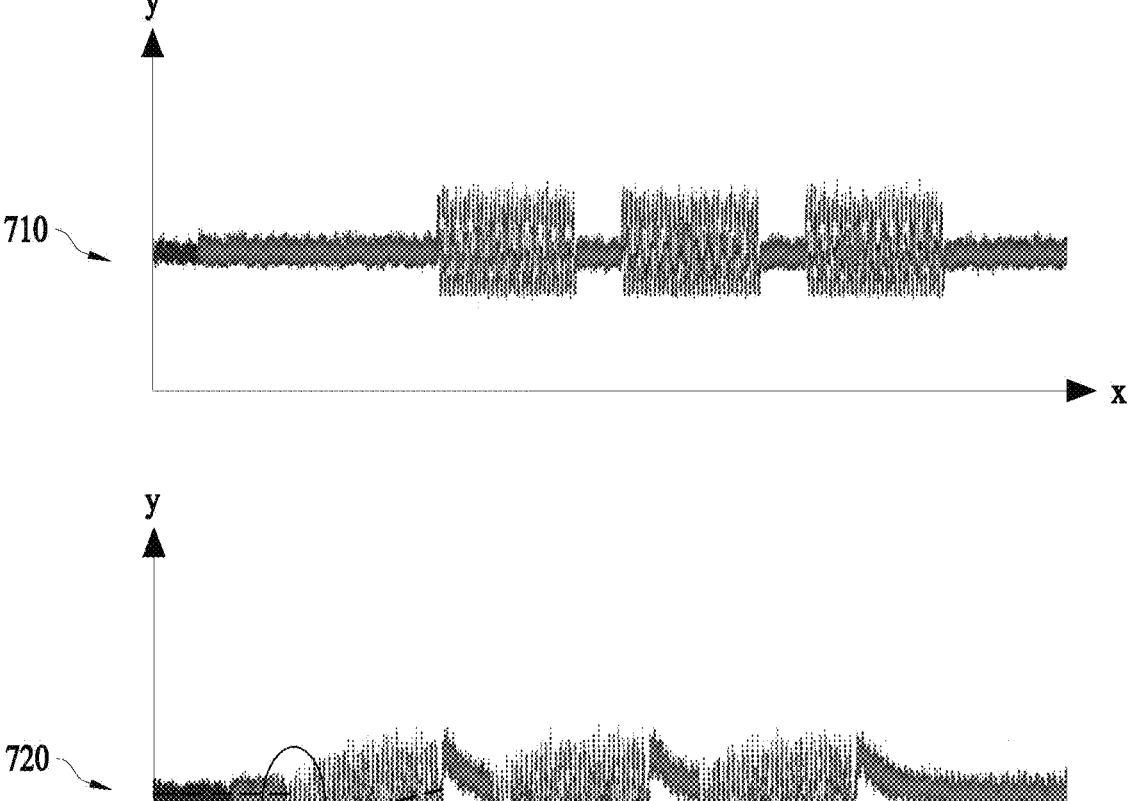
FIG. 7 is a diagram illustrating motor voltage control according to a battery state of an electronic device according to an example embodiment of the present specification.

The electronic device may control the second motor so that a difference between an output voltage of a battery and a voltage corresponding to the second motor is maintained to be greater than or equal to a predetermined value. For example, when the difference between the output voltage of the battery and the voltage corresponding to the second motor is less than a designated value, the electronic device may decrease a driving voltage of the second motor. For example, when the output voltage of the battery is a predetermined value (e.g., an output voltage value in a state in which the battery is fully charged), the decreased driving voltage may correspond to a voltage required for synthesis of the electric wire current. FIG. 7 may be referenced for a specific example associated therewith.

Figure 4:
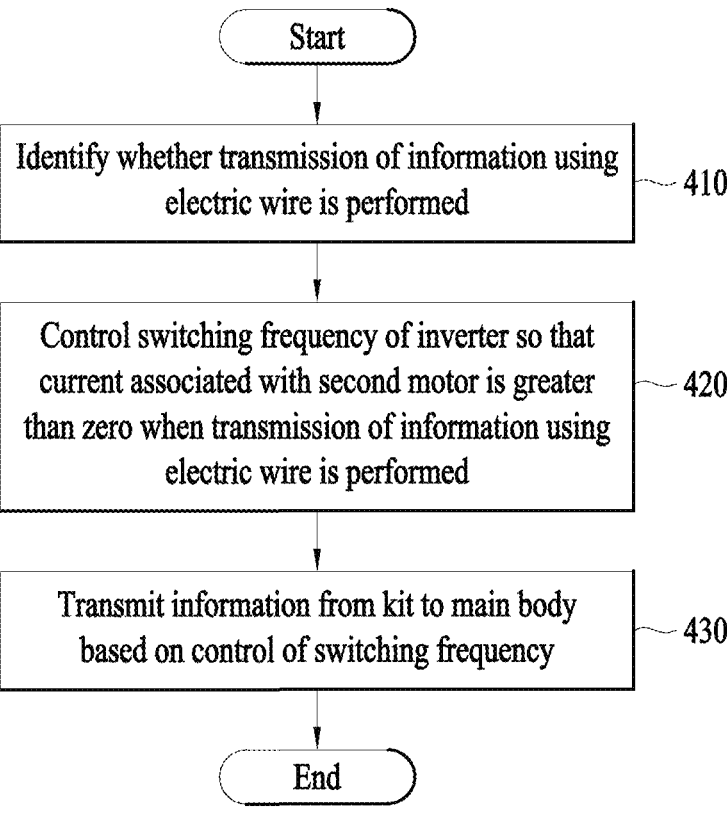
FIG. 4 is a flowchart illustrating each operation in an operation method of an electronic device according to another example embodiment of the present specification.

FIG. 4 is a flowchart illustrating each operation in an operation method of an electronic device according to another example embodiment of the present specification.

Referring to FIG. 4, in operation 410, an electronic device may identify whether transmission of information (or electric wire communication) using an electric wire is performed. As an example, a second controller included in a kit may identify whether the communication using the electric wire from the kit to a main body starts. A start of the communication using the electric wire may be performed when the second controller identifies certain information (e.g., sensing a change of a speed or information recognition through a sensor) in association with a use environment of the electronic device. At this point, the certain information associated with the use environment may include at least one of information independently identified by the second controller and information identified through a sensor included in the electronic device (or the kit).

As another example, the second controller may start the communication using the electric wire from the kit to the main body in response to an information request signal being received from a first controller of the main body. In such a case, when the information request signal is received from the first controller, the second controller may identify the transmission of the information using the electric wire as being performed.

In operation 420, when the transmission of the information using the electric wire is performed, the electronic device may control a switching frequency of an inverter so that a current associated with a second motor included in the kit is greater than zero. For example, when the transmission of the information using the electric wire is performed, the electronic device may control the switching frequency of the inverter included in the kit to be in a state in which the switching frequency is greater than or equal to a predetermined value (e.g., 40 kHz) so that the transmission of the information is performed. As such, when the current associated with the second motor is greater than zero, a mode of the second motor may be a CCM.

In example embodiments, the electronic device may control the second motor to operate in the CCM in response to the communication using the electric wire being performed or control the second motor to operate in a DCM when the communication using the electric wire is not performed.

In operation 430, the electronic device may transmit the information from the kit to the main body based on control of the switching frequency. Operation 430 may correspond to operation 320.

FIG. 5 is a diagram illustrating a motor voltage of an electronic device according to an example embodiment of the present specification.

Reference numeral 511 of FIG. 5 represents a current intensity over time when a second motor included in a kit operates in a CCM. Reference numeral 512 represents a current intensity over time when the second motor included in the kit operates in a DCM.

According to FIG. 5, when the second motor operates in the CCM, an intensity of a current may be greater than zero. However, when the second motor operates in the DCM, the intensity of the current may be zero in at least a partial section.

An electronic device may adjust a switching frequency of an inverter to be greater than or equal to a predesignated value (e.g., 40 kHz) so that the intensity of the current of the second motor is greater than zero even under a load-free condition. At this point, the predesignated value of the switching frequency is merely an example, is not limited thereto, and may be changed to various values allowing the intensity of the current of the second motor to be greater than zero.

As such, when the intensity of the current of the second motor is maintained to be greater than zero, currents of an electric wire may be synthesized more than those synthesized when the second motor operates in the DCM in response to a PWM duty change. Accordingly, communication using the electric wire may be effectively performed.

FIG. 6 illustrates an equivalent circuit diagram for an intensity analysis of an electric wire current of an electric device according to an example embodiment of the present specification. Specifically, FIG. 6 illustrates an equivalent circuit diagram of a battery and a second motor included in a kit.

Referring to FIG. 6, VBAT may represent a voltage of the battery, $I_{BAT}$ may represent a current of communication using an electric wire, and $V_{MOT}$ may represent a voltage of the second motor. In FIG. 6, a symbol '-' may represent a DC variable, and a symbol '~' may represent an alternating current (AC) variable. In addition, BAT may represent a variable associated with the battery, and MOT may represent a variable associated with the second motor. R may represent a resistance of the second motor, and L may represent an inductance of the motor.

Under an assumption that the voltage of the battery is constant regardless of a PWM duty change of an inverter included in the kit, and that a PWM duty input for the communication using the electric wire is less than a PWM duty for driving of the second motor of the kit, Equation 1 may be derived based on the equivalent circuit diagram of FIG. 5.

$$\tilde{I}_{BAT} = \tilde{P}_{MOT}/V_{BAT} = \overline{d} \cdot \tilde{i}_{MOT} + \overline{d} \cdot \overline{I}_{MOT} \approx \overline{d} \cdot \tilde{i}_{MOT} \qquad \text{[Equation 1]}$$

In Equation 1, $\tilde{I}_{BAT}$ is the current for the communication using the electric wire, $\tilde{P}_{MOT}$ is AC power of the second motor. $V_{BAT}$ is a DC voltage of the battery. $\overline{d}$ is a DC duty (which is a conduction rate) of the inverter. $\tilde{i}_{MOT}$ is an AC current of the second motor. $\tilde{d}$ is an AC duty (which is a conduction rate) of the inverter. $\overline{I}_{MOT}$ is a DC current of the second motor.

Under an assumption that an electric wire current is a sine wave, Equation 2 may be derived with respect to a Laplace domain.

$$\tilde{I}_{BAT} = \overline{d} \cdot \tilde{i}_{MOT} = \overline{d} \cdot \frac{\tilde{D} \cdot V_{BAT}}{R + Ls} = \tilde{D} \cdot \frac{\overline{V}_{MOT}}{R + Ls} \qquad \text{[Equation 2]}$$

In Equation 2, $\tilde{D}$ denotes an amplitude of a sine wave duty, more specifically, an instantaneous PWM duty for the communication using the electric wire. $\overline{V}_{MOT}$ denotes a DC voltage of the second motor, specifically, an average voltage for the driving of the second motor. In addition, R+Ls denotes a motor constant determined in association with the resistance and the inductance of the second motor (and in association with variables of Equation 2, redundant descriptions similar to the above descriptions will be omitted).

According to Equation 2, an intensity of the current for the communication using the electric wire may be affected by the average voltage for the driving of the second motor, the resistance, and the inductance. Accordingly, an electric device may determine the PWM duty for the communication using the electric wire in consideration of the voltage (e.g., the average voltage for the driving of the second motor), the resistance, and the inductance of the second motor so that the intensity of the current for the communication using the electric wire is a predesignated value (or is greater than or equal to the predesignated value). The electric device may control the second motor based on the determined PWM duty. Accordingly, although a DC voltage of the electronic device or an operation point of the second motor is changed, the electric wire current of a constant intensity for the communication using the electric wire may be provided.

FIG. 7 is a diagram illustrating motor voltage control according to a battery state of an electronic device according to an example embodiment of the present specification.

Reference numeral 710 of FIG. 7 is an example of a current waveform presented by timesharing-based communication using an electric wire being performed when a voltage of a battery is sufficient.

Reference numeral 720 is an example of a current waveform presented based on a driving voltage of a second motor being controlled when the voltage of the battery is insufficient due to being less than or equal to a predesignated value. Referring to FIG. 7, when the voltage of the battery is insufficient, an electronic device (or a second controller of the electronic device) may decrease the driving voltage of the second motor. Specifically, a current may be maintained to be an average value corresponding to a first point 721 before the communication using the electric wire is performed. In such a case, the communication using the electric wire may start based on timesharing communication at a time point corresponding to the first point 721. When the communication using the electric wire starts, the electronic device may identify the voltage of the battery. When the identified voltage is insufficient (for example, when the voltage of the battery is less than or equal to the predesignated value, or when a difference between the voltage of the battery and a voltage corresponding to the second motor is less than or equal to a predesignated value), the electronic device may decrease the driving voltage of the second motor as shown in a second point 722.

In such a case, since a voltage remaining due to a decrease in the driving voltage may be used to synthesize the current for the communication using the electric wire, a current (or a sine wave) identical to that of the reference numeral 710 in intensity may be synthesized even in a case of the reference numeral 720.

Figure 8:
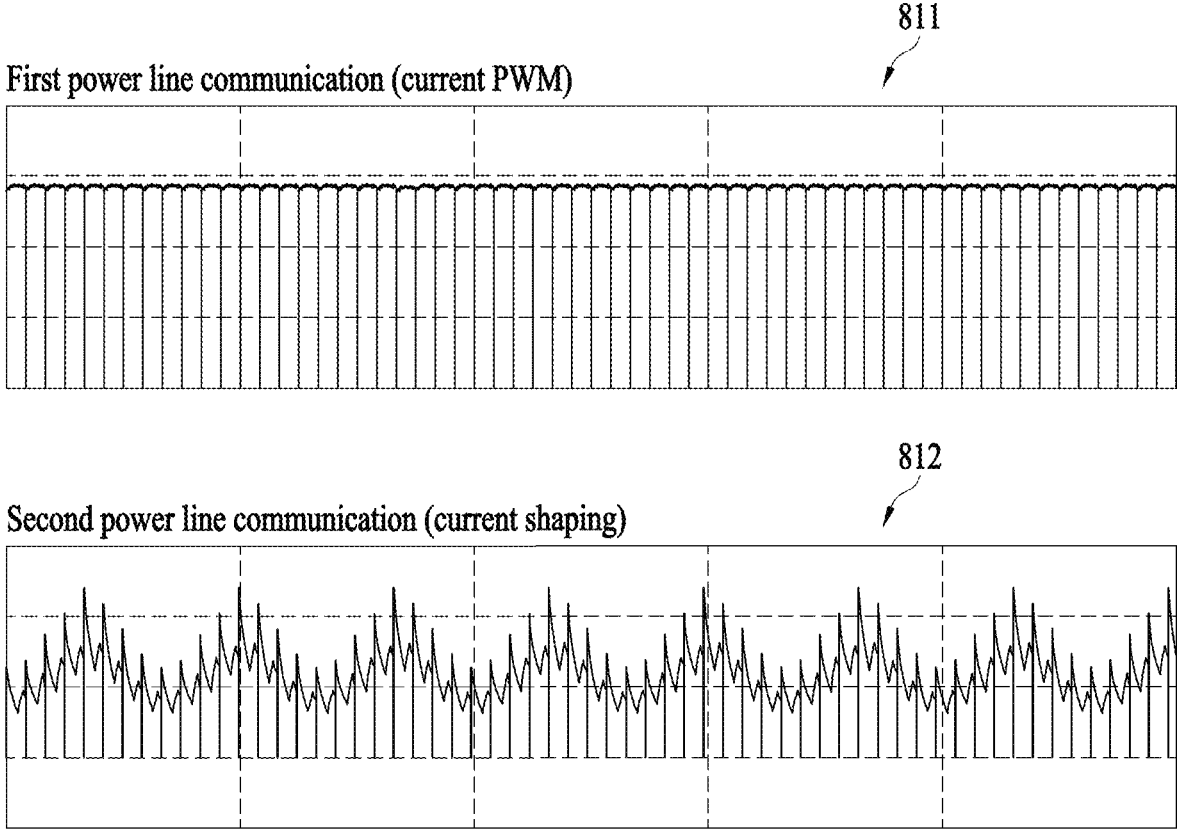
FIG. 8 is a diagram illustrating an example of a communication method using an electronic wire usable in an electronic device according to an example embodiment of the present specification.

FIG. 8 is a diagram illustrating an example of a communication method using an electronic wire usable in an electronic device according to an example embodiment of the present specification. Specifically, FIG. 8 illustrates an example of a method of information transmission from a main body to a kit and a method of information transmission from the kit to the main body when communication using an electric wire is used between the main body and the kit.

Reference numeral 811 of FIG. 8 represents an example of a waveform presented by the method of the information transmission from the main body to the kit. The method of the information transmission from the main body to the kit may be referred to as first power line communication. The first power line communication may be performed based on voltage PWM control. In such a case, a waveform identical to that of the reference numeral 811 may be presented. However, it is merely an example, the waveform is not limited thereto, and a communication method of the following reference numeral 812 may be used.

A signal corresponding to the reference numeral 811 may include information for controlling an operation of the second motor 221 and/or the kit 220.

Reference numeral 812 represents an example of a waveform presented by the method of the information transmission from the kit to the main body. When communication between the main body and the kit of an electronic device is performed in both directions, the method of the information transmission from the kit to the main body may be referred to as second power line communication. The second power line communication may be performed based on a current shaping method.

When information is transmitted from the kit to the main body by using the electric wire included in the electronic device, an inverter may be controlled so that a voltage of the motor is maintained to be a value greater than zero. Through this, constant performance may be guaranteed so that performance of the communication using the electric wire is not decreased regardless of a use environment of the electronic device.

Figure 9:
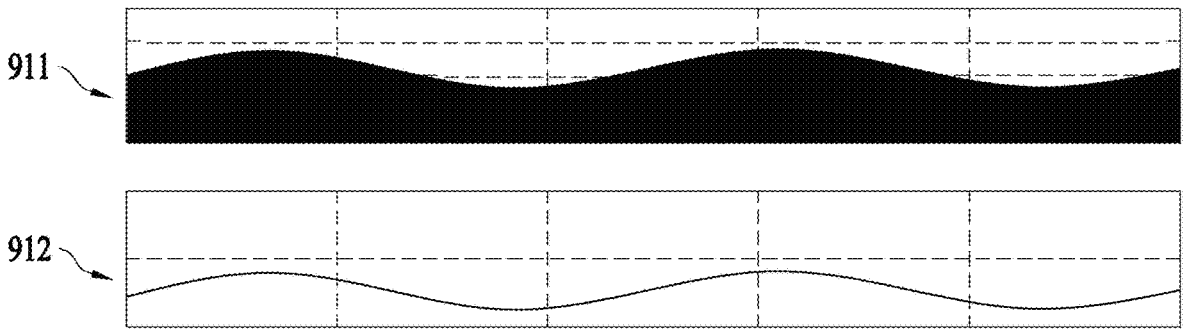
FIG. 9 is a conceptual diagram illustrating a waveform associated with a low pass filter circuit of an electronic device according to an example embodiment of the present specification.

FIG. 9 is a conceptual diagram illustrating a waveform associated with a low pass filter circuit of an electronic device according to an example embodiment of the present specification. Specifically, FIG. 9 conceptually illustrates a waveform before and after processed by a low pass filter circuit of an electronic device.

Reference numeral 911 of FIG. 9 represents a waveform before processed by the low pass filter circuit, and reference numeral 912 represents a waveform after processed by the low pass filter circuit.

In example embodiments, the waveform before processed by the low pass filter circuit may be for a signal including information transmitted from a kit (or a second controller) to a main body. A first controller included in the main body of the electronic device may receive a signal processed by the low pass filter circuit, in other words, an output value of the low pass filter circuit. The first controller may identify information on the kit (e.g., a moving speed of the kit, actual suction force of the kit, or whether an object adjacent to the kit is present) based on the received value and control an operation of the kit.

Also, the electronic device according to example embodiments of the present specification and an operation method thereof may control a PWM duty of a motor so that an intensity of a current is constantly maintained although a voltage of a DC terminal or an operation point of the motor is changed. Through this, reliability and performance of communication using an electric wire may be increased.

In addition, when a difference between a driving voltage of the motor and a voltage of a battery is small, for example, when the voltage of the battery is insufficient, the electronic device according to example embodiments of the present specification and the operation method thereof may temporarily decrease the driving voltage of the motor to secure a voltage for the communication using the electric wire. Through this, the reliability and the performance of the communication using an electric wire may be guaranteed regardless of a use environment of the electronic device.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, those skilled in the art will understand the scope of the disclosure is not limited by the explicitly described above embodiments but by the claims and equivalents thereof.

The invention claimed is:

1. An electronic device comprising a main body and a kit connected to the main body,
   wherein the main body comprises a battery, a first motor, an electric wire connected to the battery, and a first controller connected to the electric wire,
   the kit comprises a second motor supplied with power through the electric wire, an inverter connected to the second motor, and a second controller connected to the electric wire and configured to control driving of the inverter, and
   the second controller is configured to transmit information to the first controller through switching frequency control of the inverter and control a switching frequency of the inverter so that a current associated with the second motor is greater than zero in a section in which transmission of the information is performed.

2. The electronic device of claim 1, wherein the main body further comprises a low pass filter circuit of which one side is connected to the electric wire and another side is connected to the first controller, and
   the first controller is configured to control an operation of the kit based on an output value of the low pass filter circuit.

3. The electronic device of claim 1, wherein the second controller is configured to control the switching frequency so that a current flowing through the electric wire includes a sinusoidal component, and the information is transmitted based on a property of the sinusoidal component.

4. The electronic device of claim 1, wherein the second controller is configured to control the switching frequency of the inverter so that the current associated with the second motor is zero in at least a partial section in a period in which the transmission of the information is not performed.

5. The electronic device of claim 1, wherein the second controller is configured to control the second motor based on a pulse width modulation (PWM) duty value on the switching signal of the inverter determined based on at least one value of a voltage, a resistance, and an inductance of the second motor.

6. The electronic device of claim 1, wherein the second controller is configured to control the second motor so that a difference between an output voltage of the battery and a voltage corresponding to the second motor is maintained to be a predesignated value or more.

7. The electronic device of claim 1, wherein when a difference between an output voltage of the battery and a voltage corresponding to the second motor is less than a predesignated value, the second controller is configured to control a driving voltage of the second motor.

8. The electronic device of claim 1, wherein the second controller is configured to control a voltage corresponding to the second motor in response to a difference between an output voltage of the battery and the voltage corresponding to the second motor being less than a predesignated value.

9. The electronic device of claim 1, wherein the second controller is configured to control a voltage corresponding to the second motor to be decreased in response to a difference between an output voltage of the battery and the voltage corresponding to the second motor being less than or equal to a predetermined value.

10. The electronic device of claim 1, wherein the second controller is configured to transmit information to the first controller through a current flowing through the electric wire being shaped through control of the switching frequency.

11. The electronic device of claim 1, wherein the information transmitted to the first controller includes at least one of identification information on the kit, operation information on the second motor, use time information on the kit, sensing information on an object adjacent to the kit, and revolutions per minute (RPM) information on the second motor.

12. The electronic device of claim 1, wherein the kit is detachable from the main body and further includes a sensor sensing whether the kit is detached from the main body, and
   the second is configured to transmit data to the first controller based on the coupling with the main body being sensed and the current shaping method.

13. An operation method of an electronic device comprising a main body and a kit connected to the main body, the operation method comprising:
   controlling a switching frequency of an inverter included in the kit; and
   transmitting information from the kit to the main body based on control of the switching frequency,
   wherein the main body comprises a battery, a first motor, an electric wire connected to the battery, and a first controller connected to the electric wire,
   the kit comprises a second motor supplied with power through the electric wire, the inverter connected to the second motor, and a second controller connected to the electric wire and configured to control driving of the inverter, and a current associated with the second motor is greater than zero in a section in which transmission of the information is performed through the control of the switching frequency.

14. The operation method of claim 13, wherein a current flowing through the electric wire includes a sinusoidal component, the information is transmitted based on a property of the sinusoidal component, and the method further comprises controlling the second motor so that a difference between an output voltage of the battery and a voltage corresponding to the second motor is maintained to be a predetermined value or more.

15. The operation method of claim 13, wherein the information transmitted to the first controller includes at least one of identification information on the kit, operation information on the second motor, use time information on the kit, sensing information on an object adjacent to the kit, and revolutions per minute (RPM) information on the second motor.

* * * * *